May 25, 1926.
L. CAILLARD
1,586,406
PROCESS FOR THE INSULATION OF ACCUMULATOR PLATES OF DIFFERENT POLARITIES
Filed June 6, 1924
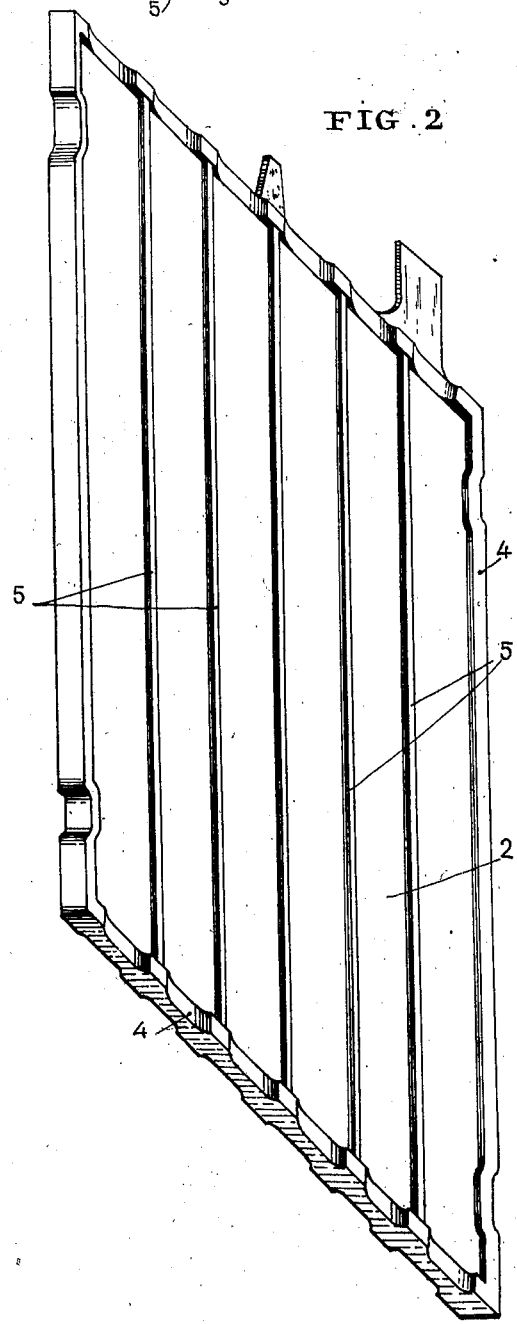
INVENTOR
Leon Caillard
BY
ATTORNEYS Patented May 25, 1926.

1,586,406

UNITED STATES PATENT OFFICE.

LÉON CAILLARD, OF LEVALLOIS-PERRET, FRANCE.

PROCESS FOR THE INSULATION OF ACCUMULATOR PLATES OF DIFFERENT POLARITIES.

Application filed June 6, 1924. Serial No. 718,346.

This invention has for its object a process and the corresponding apparatus for the insulation of accumulator plates of different polarities, in order to effectively prevent any possibility of contact between the positive plates and the negative plates, being caused, by the active material falling from the plate for example.

It has already been proposed, in order to prevent short circuits due specially to the fall of active material from the positive plates, that separating partitions be arranged in different positions between the accumulator plates, but the arrangements used for this purpose are only relatively effective for the active material which falls chiefly from the positive plates, can accumulate at the bottom of the vessel and can thus come in contact with the neighbouring negative plates.

The process according to the present invention removes these inconveniences and consists in entirely enclosing each positive accumulator plate for example in a protecting compartment, which can be easily traversed by the electric ions, and the resistance of whose walls is sufficient to maintain the active material which may become detached from the positive plate, thereby preventing it from falling to the bottom of the vessel.

In the accompanying drawing which represents for the sake of a practical example of the invention, a constructional form of an accumulator plate:

Figure 1 is a transverse section of a plate,
Figure 2 is a perspective view of this plate.

For carrying the process into effect, all the accumulator plates of the same polarity, for example the positive plates, which are more subjected to deterioration, are housed in a compartment or cell, whose walls are formed by plates of substance permeable to electric ions as well as to the electrolyte, such for example as thin plates of wood suitably arranged.

In the constructional form represented in the drawing, the accumulator plate 1 is covered over on its two faces, with membranes 2, 3 of wood of small thickness, which have been subjected to suitable treatment. These membranes 2, 3 may either be applied directly against the accumulator plate 1, or may be placed at a suitable distance from said plate. The two membranes 2, 3 are connected together, over the whole periphery of the plate 1, by a framing 4, which is suitably fixed on the said membranes and which may for example be of ebonite, maintained upon the said membranes by vulcanization or in any other suitable manner.

The membranes 2, 3 comprise on their exterior face, ribs 5 for stiffening the said membranes, as well as for maintaining the negative and positive plates at a suitable distance apart.

In setting up this envelope, the accumulator plate 1 is placed in a mould to vulcanize the caoutchouc while the membranes or screens of wood 2, 3 of suitable thickness are arranged upon the two faces of the plate.

Within grooves of the mould are arranged unvulcanized sheets of ebonite for forming the sides of the frame 4, as well as the stripe which should constitute the ribs 5. The vulcanization is then effected in any suitable manner so as to rigidly hold the membranes 2, 3 solid with the sheets of ebonite 4 as well as with the ribs 5, while the said sheets 4 are at the same time joined together for forming the frame. Once this vulcanization is effected, the plate 5 is totally enclosed and receives complete protection, preventing, in an absolute manner, any fall of active material.

The framing 4 will be traversed by the electrodes or other means of junction, of usual form and arrangement.

The complete membranes 2, 3 could be replaced by perforated partitions made of a substance which is a non-conductor of electricity, as for example the wood ebonite. These membranes could also be replaced by permeable screens, such for example as textile fabrics or any other substances preferably offering sufficient resistance to shocks, and to bending.

The envelope of the accumulator plate could be constituted in any suitable manner other than that described, the framing being connected to the membranes in any suitable manner. This connection could also be set up in a removable manner in order to permit of the repair of the accumulator plate.

The membranes 2, 3 could also be omitted, and there could be placed on the accumulator plate 1, either simply the frame 4, or this frame 4 with the addition of ribs such as 5 vulcanized together. The said ribs could be arranged, either solely on the sides of the frame 4 or on the ends, or on both sides and ends and in the horizontal direction.

The invention can be employed with accumulator plates of any kind of any pattern and for all applications, whatever may be the form and dimensions of the plates.

What I claim is:

1. The herein described process of forming an insulating envelope on an accumulator plate, consisting in vulcanizing the envelope on the plate and simultaneously forming the envelope with the ribs.

2. The herein described process of forming an insulating envelope on an accumulator plate consisting in placing an accumulator plate in a grooved mold, applying sheets of permeable material to the sides of the plate, applying a strip of ebonite to the edges of the plates in overlapping engagement with the sheets, placing vulcanized rubber in the grooves of the mold, and vulcanizing the ebonite strip and unvulcanized rubber to the said sheets.

3. The herein described process of forming an insulating envelope on an accumulator plate, consisting in applying sheets of permeable material to the sides of the plate and a frame of ebonite or hardened caoutchouc to the edge of the plate in overlapping engagement with the said sheets and vulcanizing the ebonite or hardened caoutchouc frame.

4. The herein described process of forming an insulating envelope on an accumulator plate, consisting in applying thin sheets of wood to the sides of the plate and a frame of ebonite or hardened caoutchouc to the edge of the frame in overlapping engagement with the sheets, placing the enclosed plate in a mold and vulcanizing the ebonite or hardened caoutchouc frame in the mold.

5. The herein described process of forming an insulating envelope on an accumulator plate, consisting in applying thin sheets of wood to the sides of the plate and a frame of ebonite or hardened caoutchouc to the edge of the frame in overlapping engagement with the said sheets, placing the same in a mold containing strips of ebonite or hardened caoutchouc disposed to extend across the sheets, and vulcanizing the frame and strips in the mold.

In testimony whereof I have hereunto set my hand.

LÉON CAILLARD.